US012582202B2

(12) United States Patent
Chang et al.

(10) Patent No.: US 12,582,202 B2
(45) Date of Patent: Mar. 24, 2026

(54) ELECTRONIC DEVICE, CARRYING BUCKLE, AND CARRYING FRAME OF CARRYING BUCKLE

(71) Applicant: WISTRON NEWEB CORPORATION, Hsinchu (TW)

(72) Inventors: Hung-Ming Chang, Hsinchu (TW); Yi-Chieh Wang, Hsinchu (TW); Jen-Yung Chang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 298 days.

(21) Appl. No.: 18/365,254

(22) Filed: Aug. 4, 2023

(65) Prior Publication Data

US 2024/0065388 A1 Feb. 29, 2024

(30) Foreign Application Priority Data

Aug. 31, 2022 (TW) .................................. 111132809

(51) Int. Cl.
| | |
|---|---|
| *A44B 11/00* | (2006.01) |
| *A44B 11/25* | (2006.01) |
| *B60R 11/00* | (2006.01) |

(52) U.S. Cl.
CPC ............ *A44B 11/005* (2013.01); *B60R 11/00* (2013.01); *A44B 11/2592* (2013.01)

(58) Field of Classification Search
CPC . A44B 11/005; A44B 11/2592; A44B 11/266; B60R 11/04
USPC .......... 24/615, 613, 617, 621, 656, 614, 662
See application file for complete search history.

(56) References Cited

U.S. PATENT DOCUMENTS

| | | | | |
|---|---|---|---|---|
| 6,931,695 | B2 * | 8/2005 | Anscher | A44B 11/2549 24/615 |
| 7,089,633 | B2 * | 8/2006 | Liu | A44B 11/266 24/615 |
| 8,196,273 | B2 * | 6/2012 | Anscher | A44B 11/266 24/615 |
| 2018/0082563 | A1 * | 3/2018 | Cristella | G08B 21/0461 |
| 2019/0054865 | A1 * | 2/2019 | Hsu | B60R 11/04 |
| 2024/0065388 | A1 * | 2/2024 | Chang | A45F 5/00 |

FOREIGN PATENT DOCUMENTS

| | | | | |
|---|---|---|---|---|
| CN | 2439047 Y | 7/2001 | | |
| CN | 104554076 A | * 4/2015 | ........ | B60R 11/0264 |
| CN | 105954958 A | * 9/2016 | .......... | G03B 17/561 |
| TW | M368212 U1 | 11/2009 | | |

* cited by examiner

*Primary Examiner* — Justin M Larson
(74) *Attorney, Agent, or Firm* — McClure, Qualey & Rodack, LLP

(57) ABSTRACT

An electronic device, a carrying buckle, and a carrying frame of a carrying buckle are provided. The carrying frame is integrally formed as a single one-piece structure and is insertable into a retaining case along an insertion direction for being fixed in the retaining case. The carrying frame includes a body segment, two buckling arms respectively extending from two opposite sides of the body segment, and an elastic structure that extends from the body segment. The elastic structure is elastically deformable when being pressed along the insertion direction, such that an abutting end of each of the two buckling arms has a displacement that allows the abutting end to be abutted against the retaining case.

20 Claims, 10 Drawing Sheets

ELECTRONIC DEVICE, CARRYING BUCKLE, AND CARRYING FRAME OF CARRYING BUCKLE

CROSS-REFERENCE TO RELATED PATENT APPLICATION

This application claims the benefit of priority to Taiwan Patent Application No. 111132809, filed on Aug. 31, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a carrying device, and more particularly to an electronic device, a carrying buckle, and a carrying frame of a carrying buckle.

BACKGROUND OF THE DISCLOSURE

An electronic component such as a camera can be placed at a desired location through a carrying device. However, convention carrying devices are composed of several parts, and the gaps between the parts due to assembly tolerance would cause relative movement like shaking of the parts, thereby generating noise and wear and tear.

SUMMARY OF THE DISCLOSURE

In one aspect, the present disclosure provides an electronic device, which includes a carrying buckle and an electronic component. The carrying buckle includes a retaining case and a carrying frame. The retaining case has a containing slot and a through channel in communication with the containing slot. The containing slot has a slot opening located at one end of the containing slot and in communication with the through channel Two side walls of the containing slot face each other and respectively form two engaging holes, and each of the two engaging holes has a hole wall adjacent to the slot opening. The carrying frame is integrally formed as a single one-piece structure and is insertable along an insertion direction through the slot opening to be fixed in the containing slot. The carrying frame includes a body segment, two buckling arms, and an elastic structure. At least a part of the body segment passes through the through channel and is exposed from the retaining case. The two buckling arms extend respectively from two opposite sides of the body segment and are located respectively in the two engaging holes. The elastic structure extends from the body segment, and when being pressed by the containing slot in the insertion direction, the elastic structure deforms elastically such that an abutting end of each of the two buckling arms abuts against a corresponding one of the two hole walls. The electronic component is partially located in the through channel and is fixed to the body segment, and the electronic component is positioned at a preset location through the retaining case.

In another aspect, the present disclosure provides a carrying buckle, which includes a retaining case and a carrying frame. The retaining case includes a containing slot with a slot opening at one end of the containing slot and two side walls facing each other. Each of the two side walls has an engaging hole with a hole wall adjacent to the slot opening. The carrying frame is integrally formed as a single one-piece structure and is insertable through the slot opening along an insertion direction to be fixed in the containing slot. The carrying frame includes a body segment, two buckling arms extended respectively from two opposite sides of the body segment and located respectively in the two engaging holes, and an elastic structure extended from the body segment. The elastic structure deforms elastically when being pressed by the containing slot along the insertion direction, such that an abutting end of each of the two buckling arms abuts against a corresponding one of the two hole walls.

In yet another aspect, the present disclosure provides a carrying frame of a carrying buckle. The carrying frame is integrally formed as a single one-piece structure and is insertable along an insertion direction to be fixed at a retaining case. The carrying frame includes a body segment, two buckling arms extended respectively from two opposite sides of the body segment, and an elastic structure extended from the body segment. The elastic structure deforms elastically when being pressed in the insertion direction such that an abutting end of each of the two buckling arms has a displacement along the insertion direction.

In conclusion, by the elastic structure elastic deforming in the insertion direction to allow the abutting end of each buckling arm to have the displacement for abutting against the hole wall of the corresponding engaging hole, the electronic device, the carrying buckle, and the carrying frame in the present disclosure can be free of gaps between the carrying frame and the retaining case in the insertion direction, so that the noise generated by the carrying frame and the retaining case shifting toward each other is effectively prevented.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
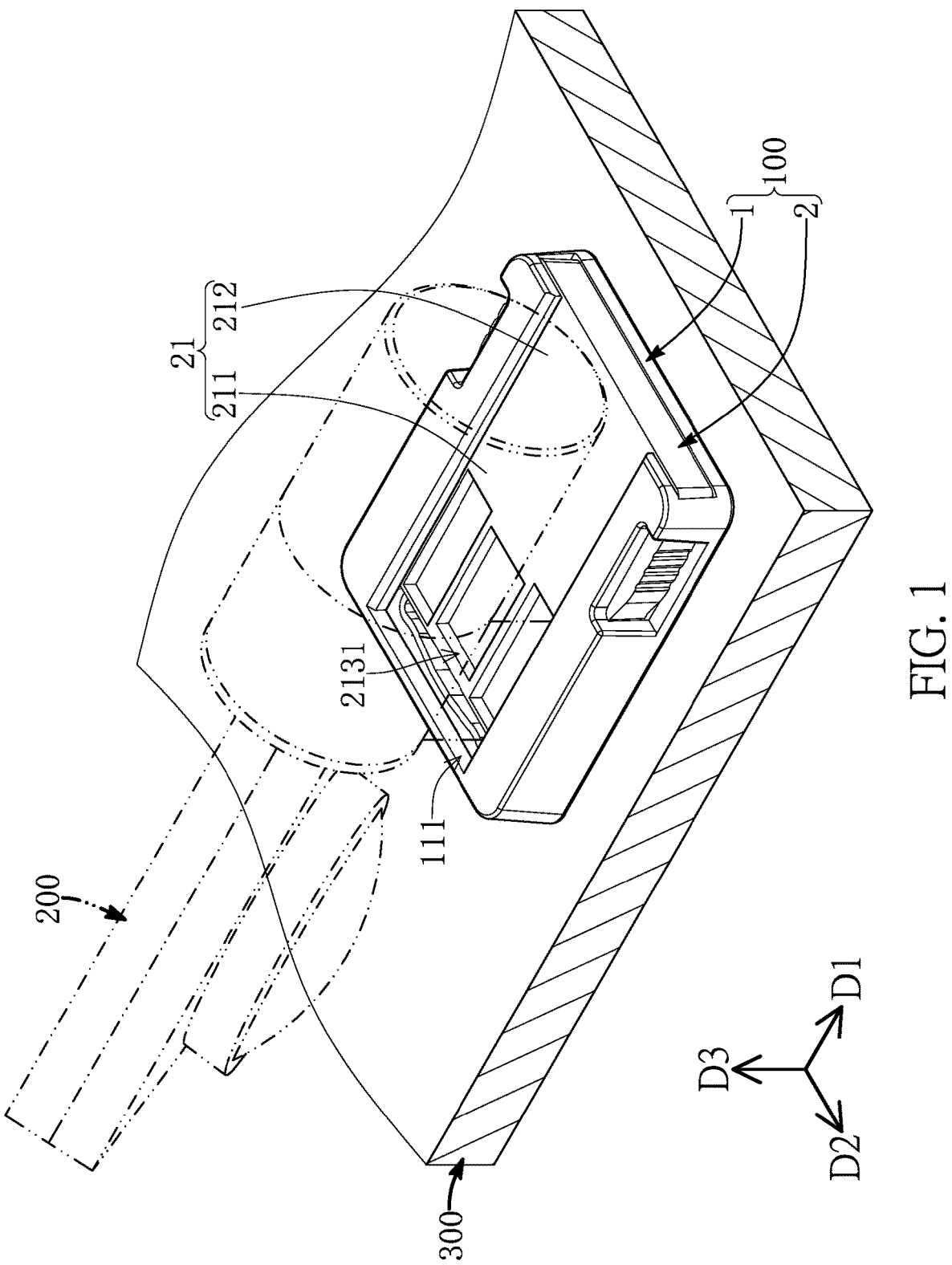
FIG. 1 is a schematic perspective view of an electronic device according to a first embodiment of the present disclosure.
Figure 2:
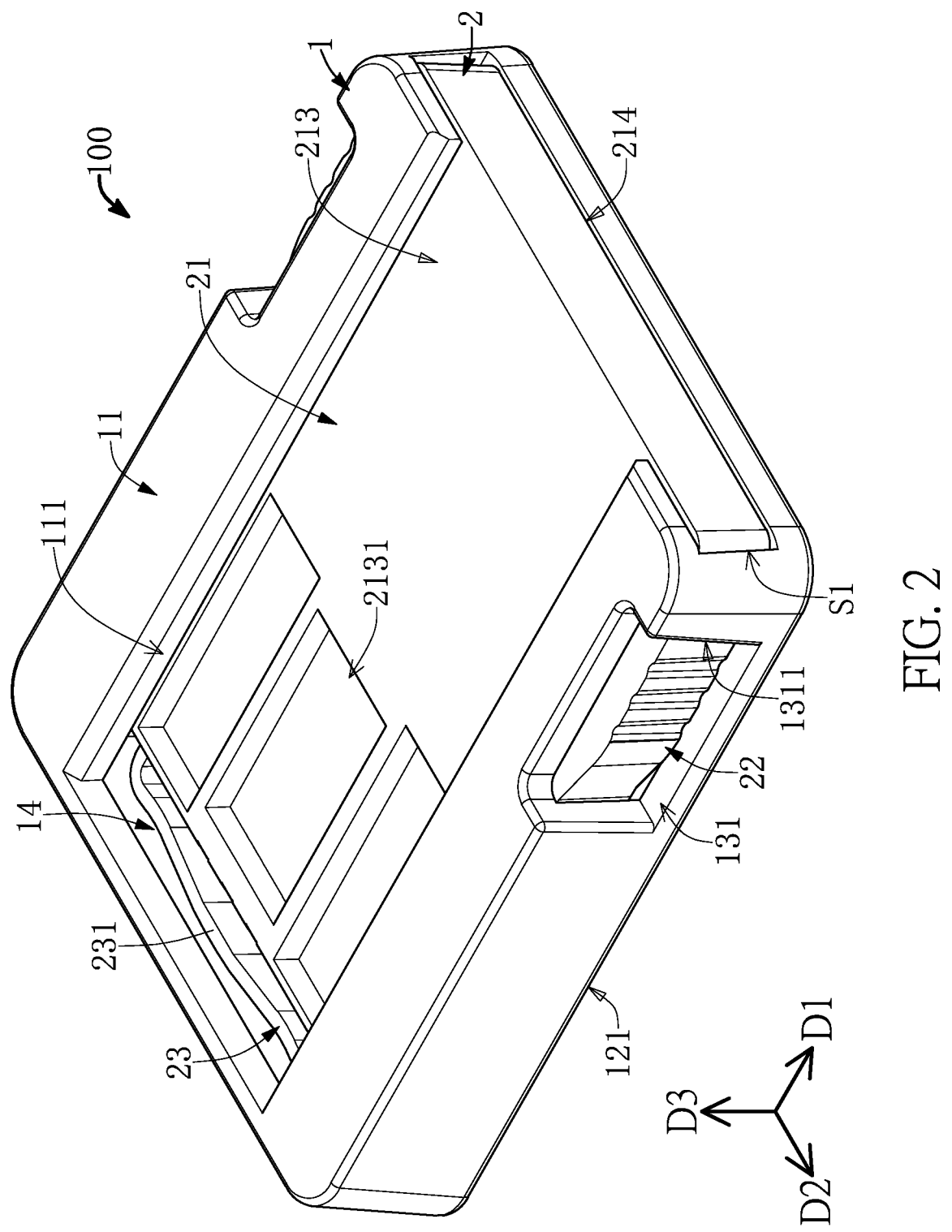
FIG. 2 is a schematic perspective view of a carrying buckle of FIG. 1.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 8, a first embodiment of the present disclosure provides an electronic device that includes a carrying buckle 100 and an electronic component 200 installed on the carrying buckle 100. The electronic component 200 can be a video recorder such as a dash-cam recorder in this embodiment, and through the carrying buckle 100, the electronic component 200 can be positioned on an object 300, like the inner surface of a windshield window, but the present disclosure is not limited thereby.

It should be noted that the carrying buckle 100 in the present embodiment is illustrated in combination with the electronic component 200, but the present disclosure is not limited thereto. For example, in other embodiments of the present disclosure, the carrying buckle 100 can be used or sold individually or can be in cooperation with other component parts.

Figure 3:
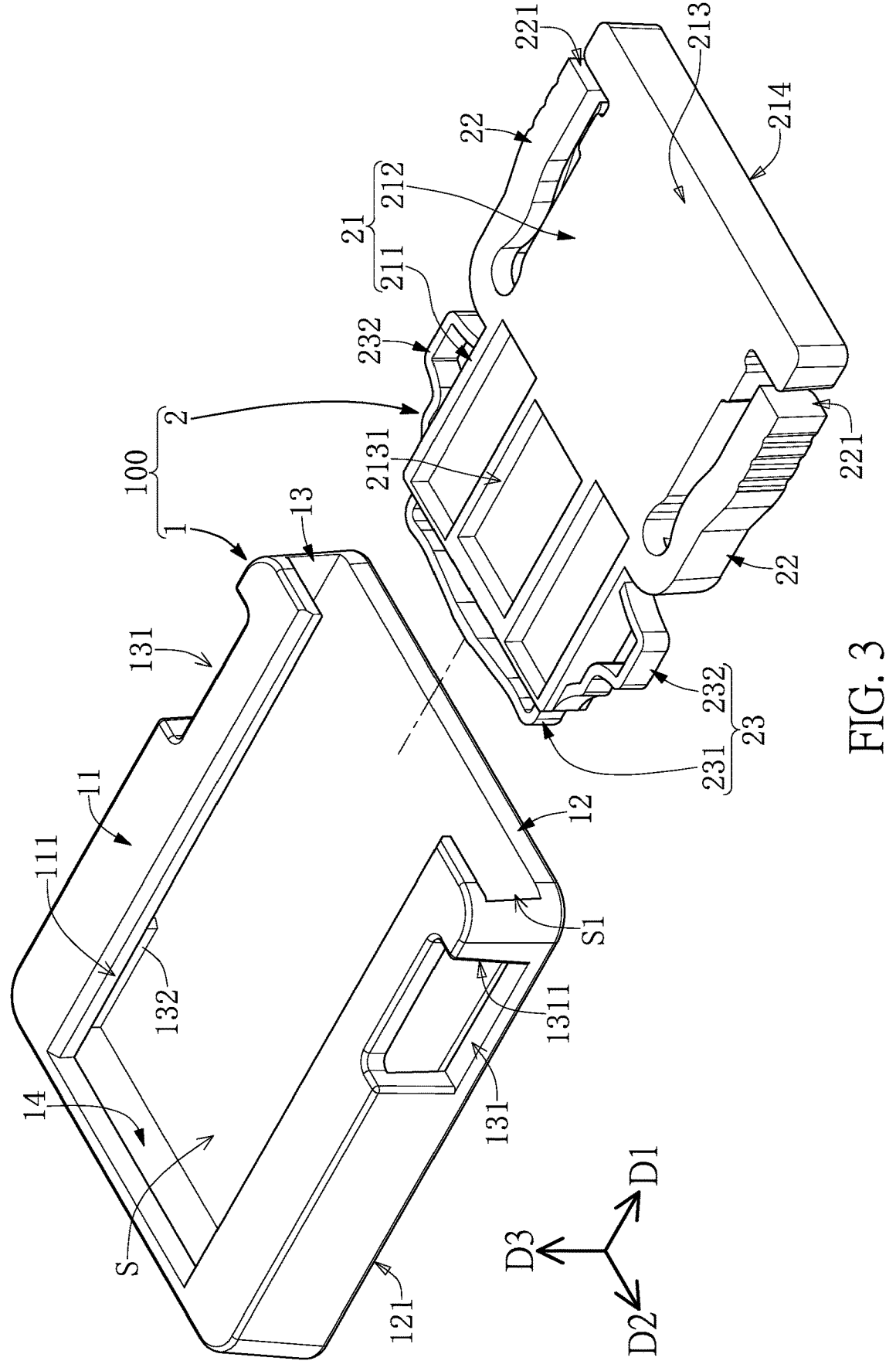
FIG. 3 is a schematic exploded view of FIG. 2.
Figure 4:
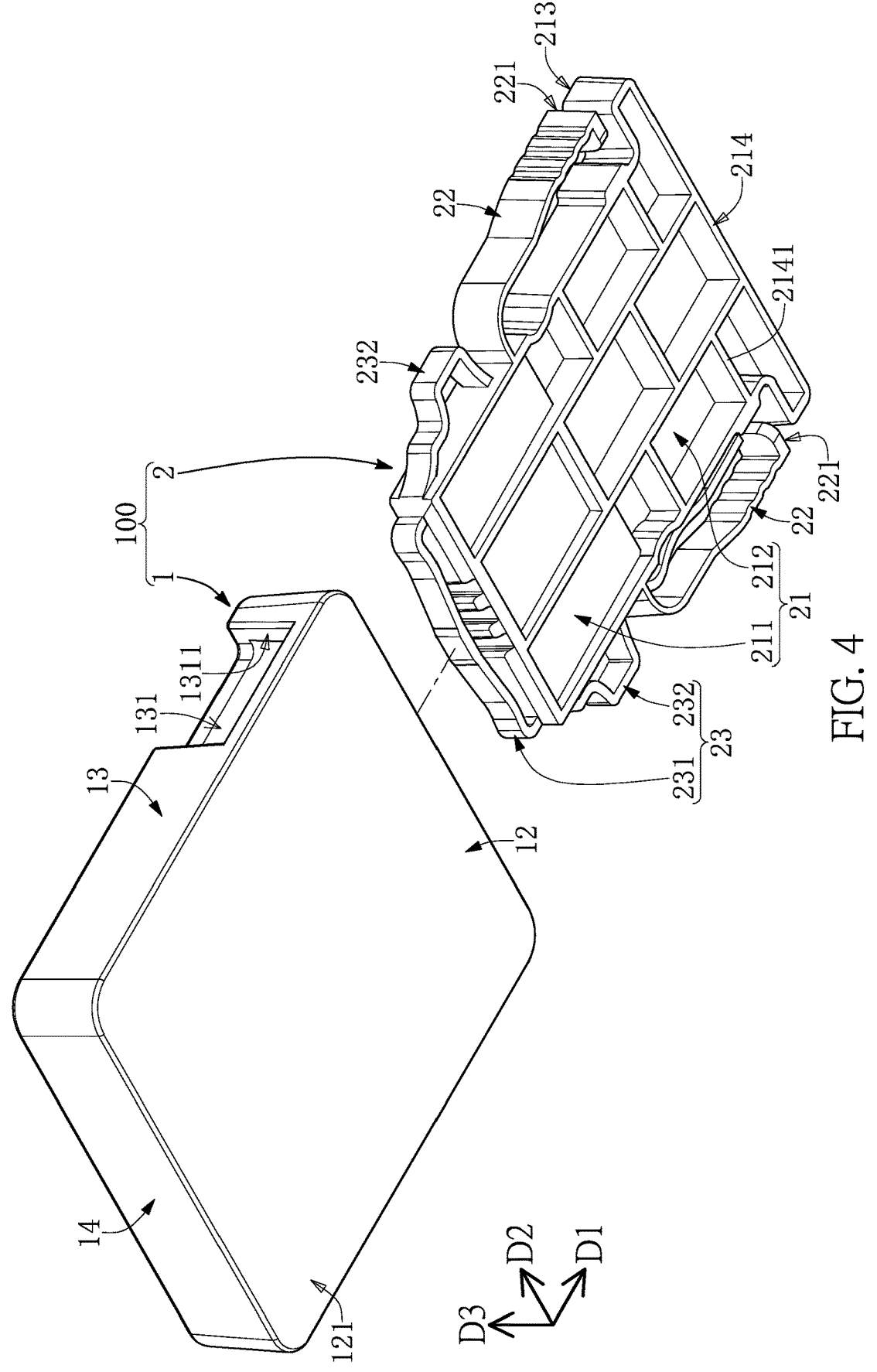
FIG. 4 is a schematic exploded view of FIG. 2 from another angle of view.
Figure 5:
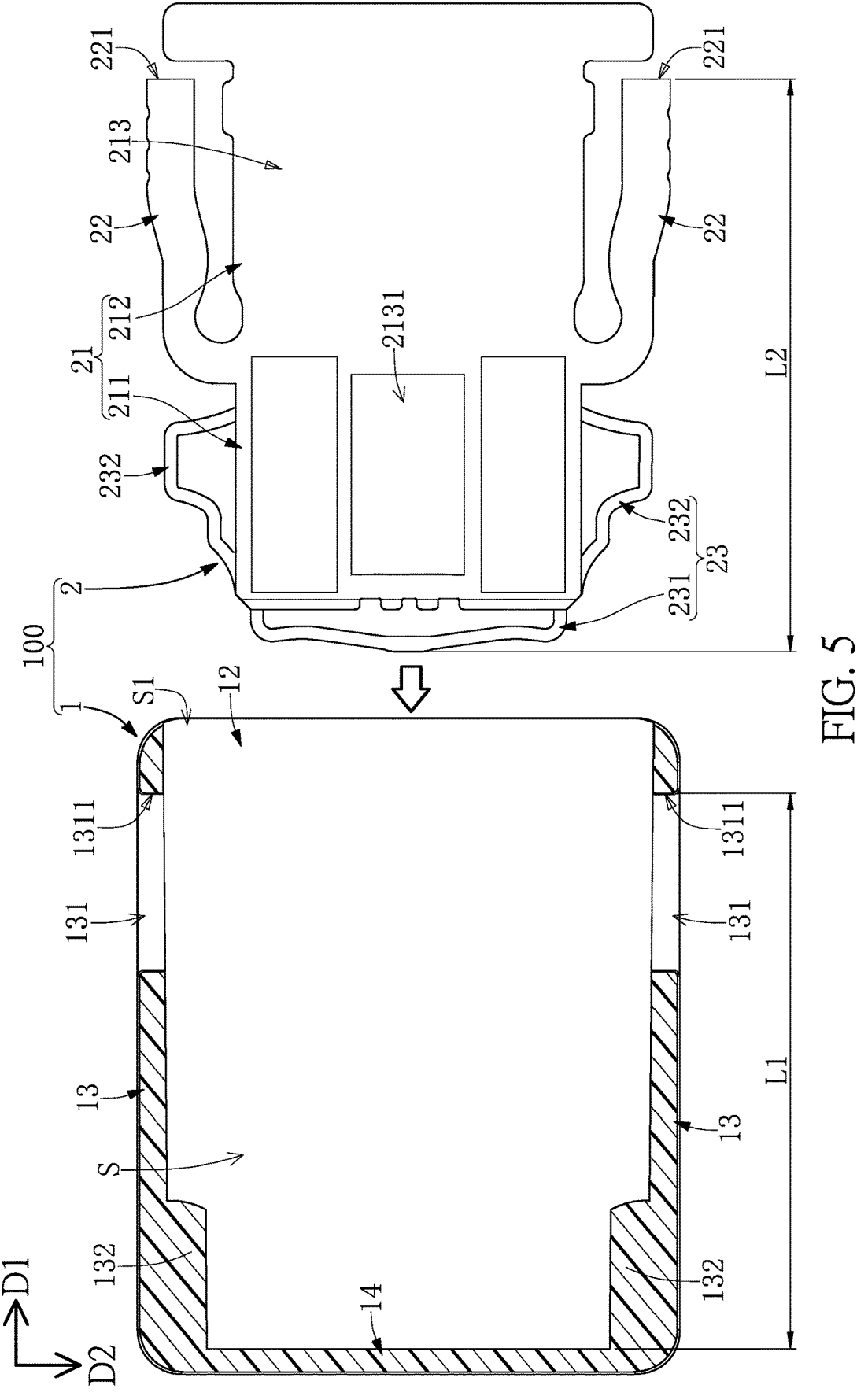
FIG. 5 is a schematic planar view of FIG. 3.
Figure 6:
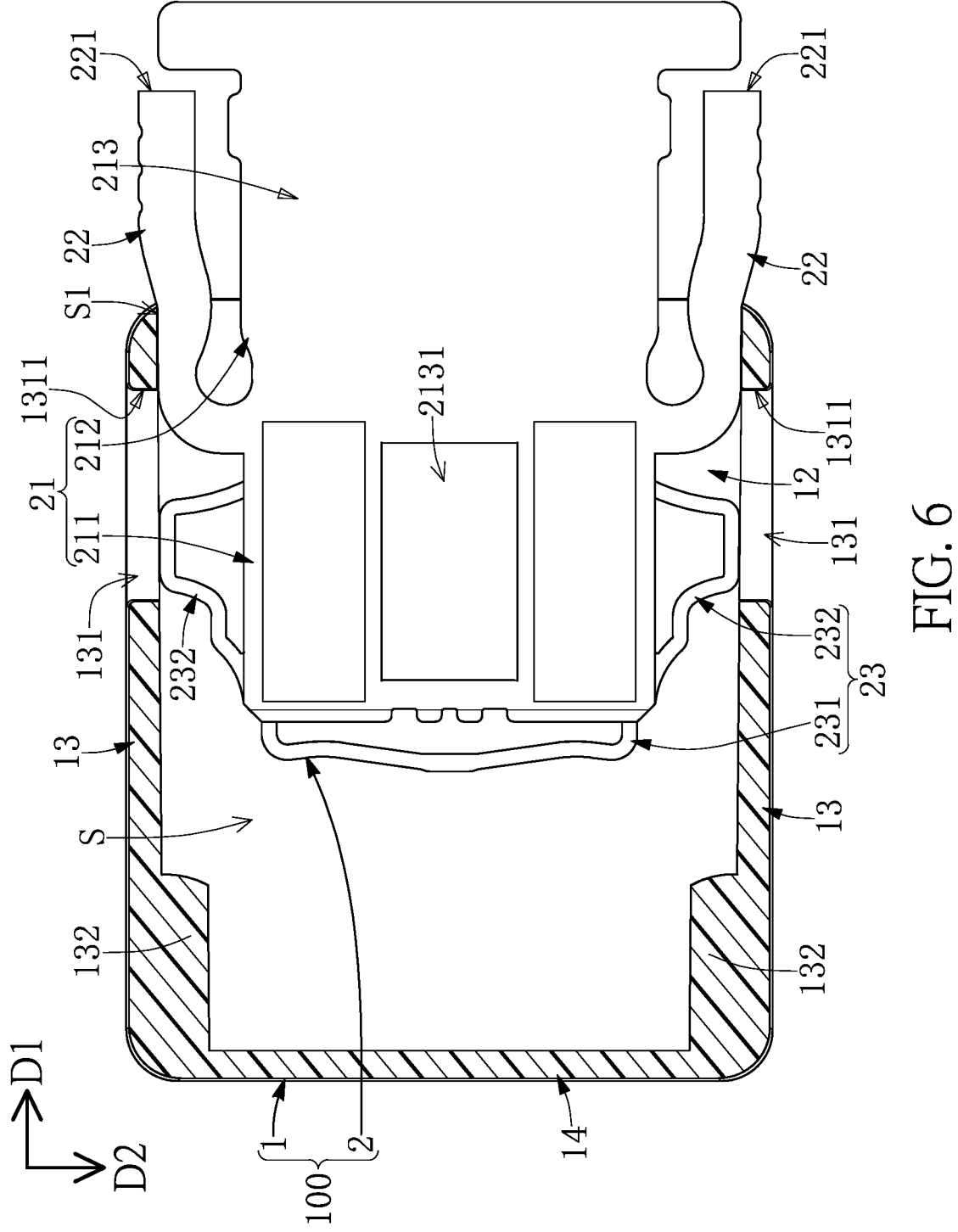
FIG. 6 is a schematic planar view of FIG. 5 during assembly.
Figure 7:
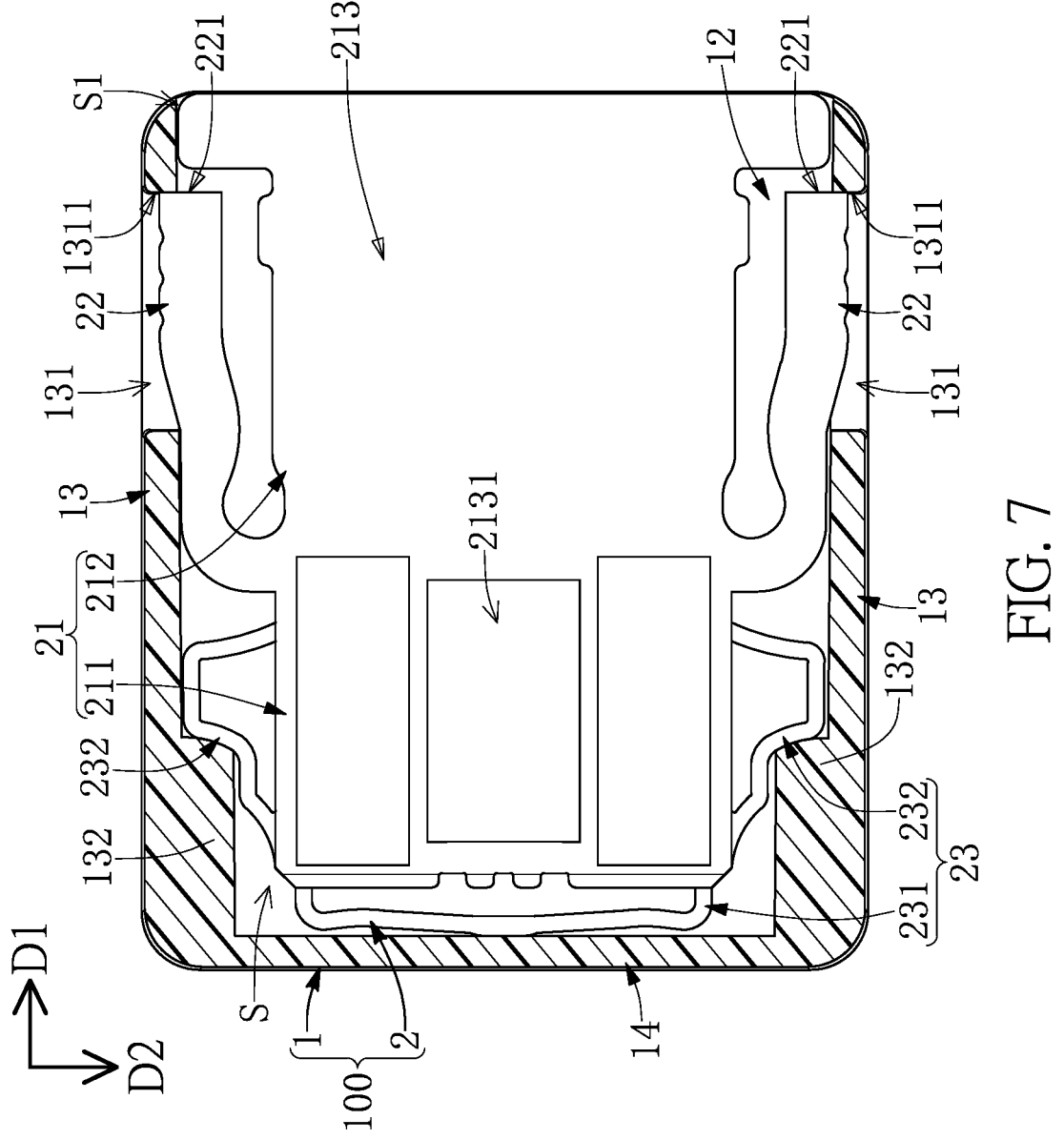
FIG. 7 is a schematic cross-sectional view of FIG. 2.

As shown in FIG. 3 to FIG. 5, the carrying buckle 100 includes a retaining case 1 and a carrying frame 2 that is insertable along an insertion direction D1 into and fixed to the retaining case 1. For ease of structural explanation, a sideway direction D2 perpendicular to the insertion direction D1 and a thickness direction D3 perpendicular to the insertion direction D1 and the sideway direction D2 are also defined in the carrying frame 2 (or the carrying buckle 100).

Specifically, the retaining case 1 looks like a rectangular box with symmetrical structure, and a containing slot S and a through channel 111 are formed in the retaining case 1. The containing slot S is surrounded by the retaining case 1, and the through channel 111 is in communication with the containing slot S along the thickness direction D3. The containing slot S has a slot opening S1 located at one of its ends, and the slot opening S1 is in communication with the through channel 111.

The containing slot S includes a first board portion 11, a second board portion 12 spaced apart from the first board portion 11 along the thickness direction D3, two side walls 13 facing each other along the sideway direction D2, and an end wall 14. The through channel 111 is formed in the first board portion 11, and so the first board portion 11 is separated into two board pieces. The outer surface of the second board portion 12 (or the retaining case 1) has a bonding surface 121 that is opposite to the through channel 111 for enabling the retaining case 1 to be attached onto the object 300.

Moreover, each of the two side walls 13 includes an engaging hole 131 and a rib 132 away from the engaging hole 131, in other words, each engaging hole 131 and its corresponding rib 132 are respectively located at two opposite ends of the side wall 13 along the insertion direction D1. Each engaging hole 131 is located close to the slot opening S1 and has a hole wall 1311 adjacent to the slot opening S1, and each rib 132 is located away from the slot opening S1.

The two engaging holes 131 are arranged along the sideway direction D2, and each engaging hole 131 in this embodiment penetrates in the sideway direction D2.

The end wall 14 is located opposite to the slot opening S1 and is connected to one end of the first board portion 11, one end of the second board portion 12, and one end of each of the two side walls 13. There is an arrangement distance L1 between the end wall 14 and any one of the hole walls 1311 along the insertion direction D1.

It is to be noted that the carrying frame 2 in this embodiment is integrally formed as a single one-piece plate structure and is described in combination with the retaining case 1, but the present disclosure is not limited thereby. For example, in other embodiments of the present disclosure, the carrying frame 2 can be used or sold independently or can be in cooperation with other component parts.

In this embodiment, the carrying frame 2 is inserted into the containing slot S through the slot opening S1 along the insertion direction and fixed to the retaining case 1. The carrying frame 2 includes a body segment 21, two buckling arms 22 respectively extended from two opposite sides of the body segment 21 (for instance, the top side and the bottom side of the body segment 21 in FIG. 5), and an elastic structure 23 extended from the body segment 21.

At least a part of the body segment 21 passes through the through channel 111 and is exposed from the retaining case 1, so that a part of the electronic component 200 is positioned at the through channel 111 and fixed to the body segment 21 as shown in FIG. 1. As such, the electronic component 200 can be placed at a preset location through the retaining case 1. In other words, together with the carrying frame 2 which the electronic component 200 is fixed to, the electronic component 200 is detachable from the retaining case 1 along the insertion direction D1.

As shown in FIG. 3 to FIG. 5, the body segment 21 includes a frontend portion 211 and a backend portion 212 connected to the frontend portion 211 along the insertion direction D1, and a tail end of the backend portion 212 closes off or seals the slot opening S1. The body segment 21, namely its outer surface, has a top side 213 and a bottom side 214 on its opposite sides. A plurality of indented assembly sections 2131 are formed on the top side 213 at the frontend portion 211 and are arranged along the sideway direction D2, and a patterned enhancement rib 2141 is formed on the bottom side 214.

Although the body segment 21 in this embodiment has the assembly sections 2131, the present disclosure is not limited thereto. For example, in other embodiments of the present disclosure, a quantity of assembly sections 2131 can be at least one, and the location of the at least one assembly section 2131 can be arranged on at least one of the frontend portion 211 and the backend portion 212 according to design requirements.

Furthermore, as shown in FIG. 1, the electronic component 200 in this embodiment is fixed to the frontend portion 211 of the carrying frame 2 and is installed (like assembled and attached) to at least one of the assembly sections 2131, so that the electronic component 200 can be firmly connected to the carrying frame 2.

As shown in FIG. 3 to FIG. 5, the two buckling arms 22 are respectively located at the two opposite sides of the backend portion 212 (e.g., the top side and the bottom side of the backend portion 212 in FIG. 5). One end of each of the buckling arms 22 is approximately connected to the junction between the frontend portion 211 and the backend portion 212, and the other end of each of the buckling arms 22 is a free end and is defined as an abutting end 221. In addition, the two buckling arms 22 are respectively located inside the two engaging holes 131 and can be elastically displaced toward the backend portion 212 when being pressed respectively by the two side walls 13 in the sideway direction D2.

Further, the elastic structure 23 elastically deforms when it is pressed by the containing slot S in the insertion direction D1, so that the abutting end 221 of each buckling arm 22 has a displacement in the insertion direction D1 for abutting against the retaining case 1. For example, the abutting end 221 is displaced and is abutted against the hole wall 1311 of the corresponding engaging hole 131. Thus, there is no gap between the carrying frame 2 and the retaining case 1 in the insertion direction D1, and the noise generated by the carrying frame 2 and the retaining case 1 hitting each other in the insertion direction D1 is effectively prevented.

It is to be noted that the specific shape of the elastic structure 23 can vary according to design requirements, and to ensure that each abutting end 221 firmly abuts against the corresponding hole wall 1311, the elastic structure 23 is preferred to includes at least some of the structural elements described herein but the present disclosure is not limited thereto.

In this embodiment, the elastic structure 23 is connected to the frontend portion 211 and includes a spring arm 231 and two side spring arms 232. The spring arm 231 and the two side spring arms 232 are spaced apart from each other. The spring arm 231 is located away from the slot opening S1 and is connected to the edge of the frontend portion 211 away from the backend portion 212 (e.g., the front edge of the frontend portion 211 in FIG. 5), and as such, the spring arm 231 and the body segment 21 together form an enclosed space.

In specific, there is a greatest distance L2 between the spring arm 231 and the abutting end 221 of any one of the two buckling arms 22 along the insertion direction D1, and the greatest distance L2 is greater than the arrangement distance L1. Therefore, the spring arm 231 elastically deforms when it is pressed by the end wall 14 of the containing slot S in the insertion direction D1, so as to help in creating the displacement that the abutting end 221 of each buckling arm 22 needed in the insertion direction D1.

Moreover, the two side spring arms 232 are connected respectively to the two opposite sides of the body segment 21 and are located respectively adjacent to the two buckling arms 22. In other words, each side spring arm 232 and the buckling arm 22 to which the side spring arm 232 is adjacent are arranged along the insertion direction D1. The two side spring arms 232 in the embodiment are connected to the frontend portion 211, and each side spring arm 232 and the body segment 21 together form an enclosed space.

The two side spring arms 232 elastically deform when they are pressed by the two ribs 132 in the insertion direction D1, so as to help the abutting end 221 of each buckling arm 22 to obtain the displacement in the insertion direction D1. The two side spring arms 232 can also elastically deform when they are pressed respectively by the two side walls 13 in the sideway direction D2 to effectively prevent the frontend portion 211 from swaying relative to or moving toward any one of the two side walls 13.

Figure 8:
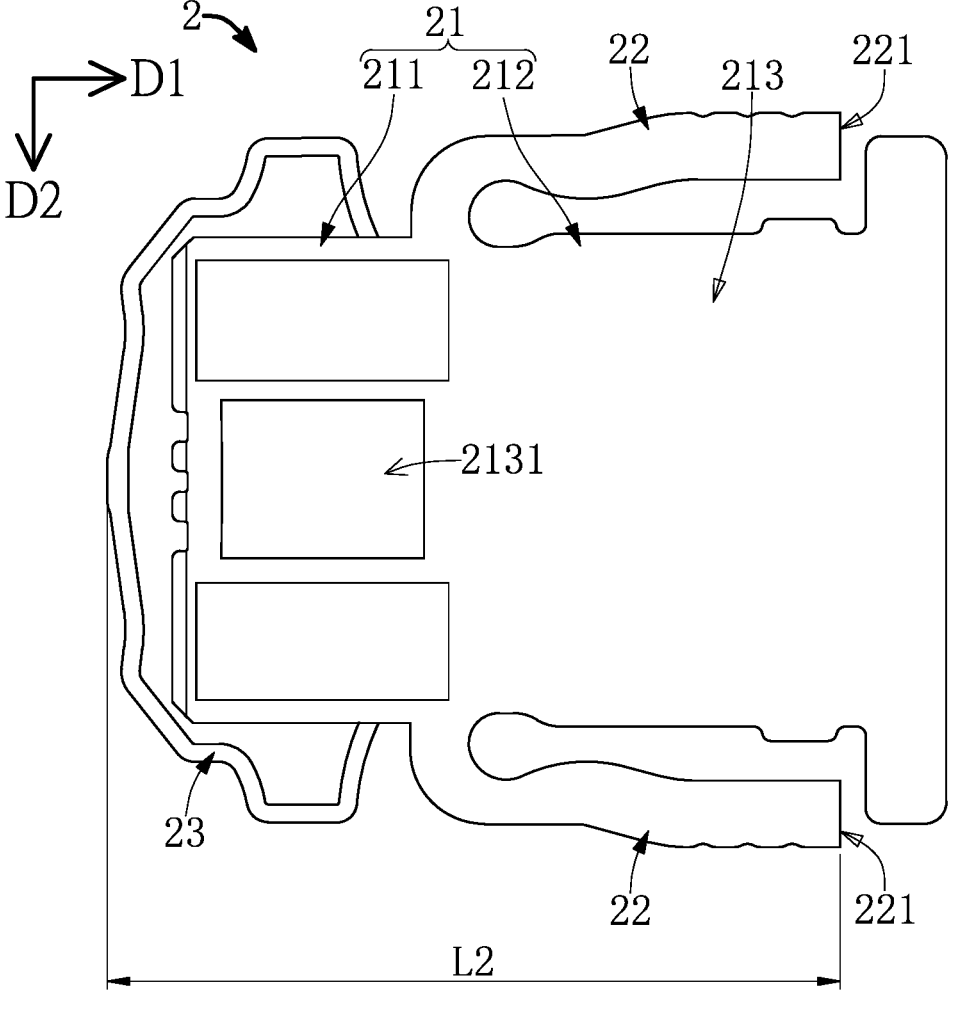
FIG. 8 is a schematic planar view showing a variation of the carrying frame according to the first embodiment of the present disclosure.

The elastic structure 23 of FIG. 1 to FIG. 7 is illustrated to have one spring arm 231 and two side spring arms 232, which as a whole helps in creating all of the displacements of the abutting ends 221 of the buckling arms 22 along the insertion direction D1, but the present disclosure is not limited thereto. For example, in other embodiments of the present disclosure, the elastic structure 23 can have just the spring arm 231 or only the two side spring arms 232; or, as shown in FIG. 8, the elastic structure 23 can be a single spring arm which surrounds the entire outer side of the frontend portion 211, in other words, the elastic structure 23 can cover the region in which the spring arm 231 and the two side spring arms 232 of FIG. 5 are located.

Second Embodiment

Figure 9:
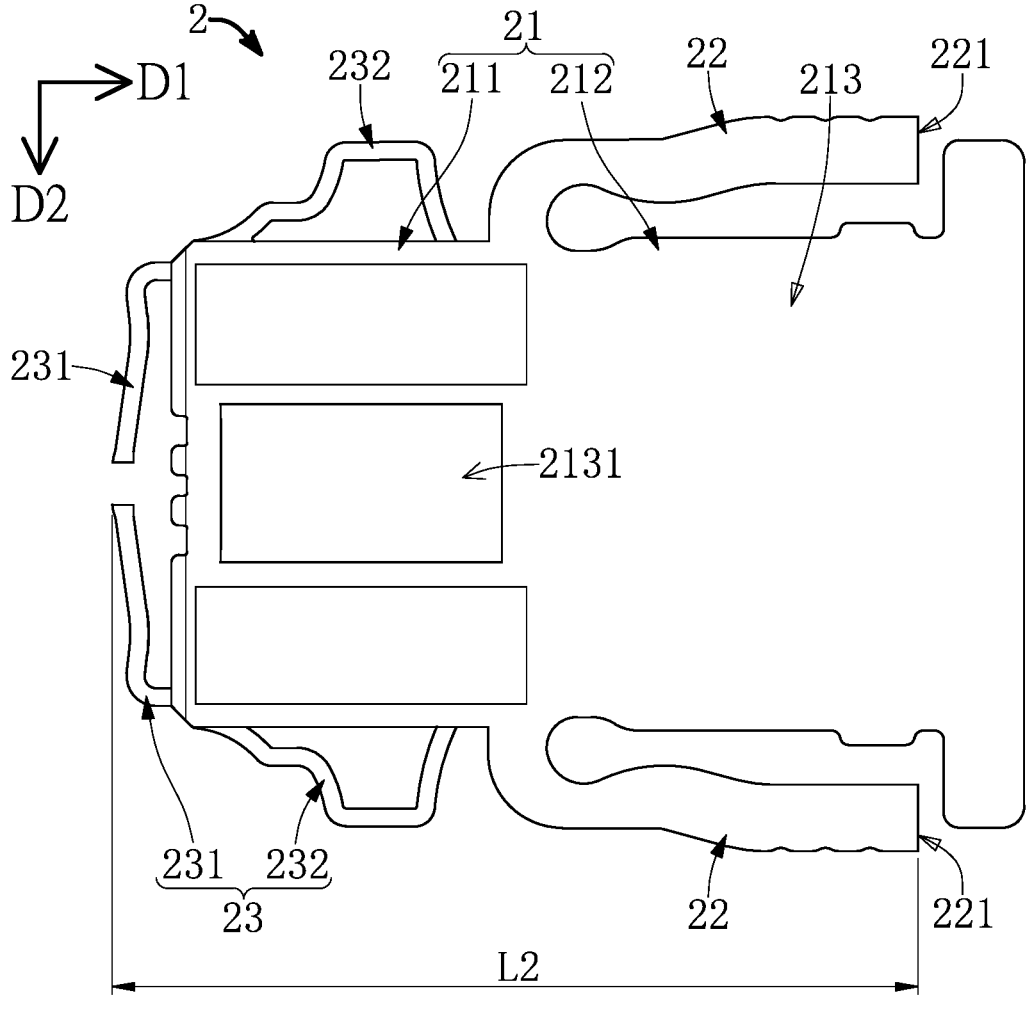
FIG. 9 is a schematic planar view of a carrying frame according to a second embodiment of the present disclosure.
Figure 10:
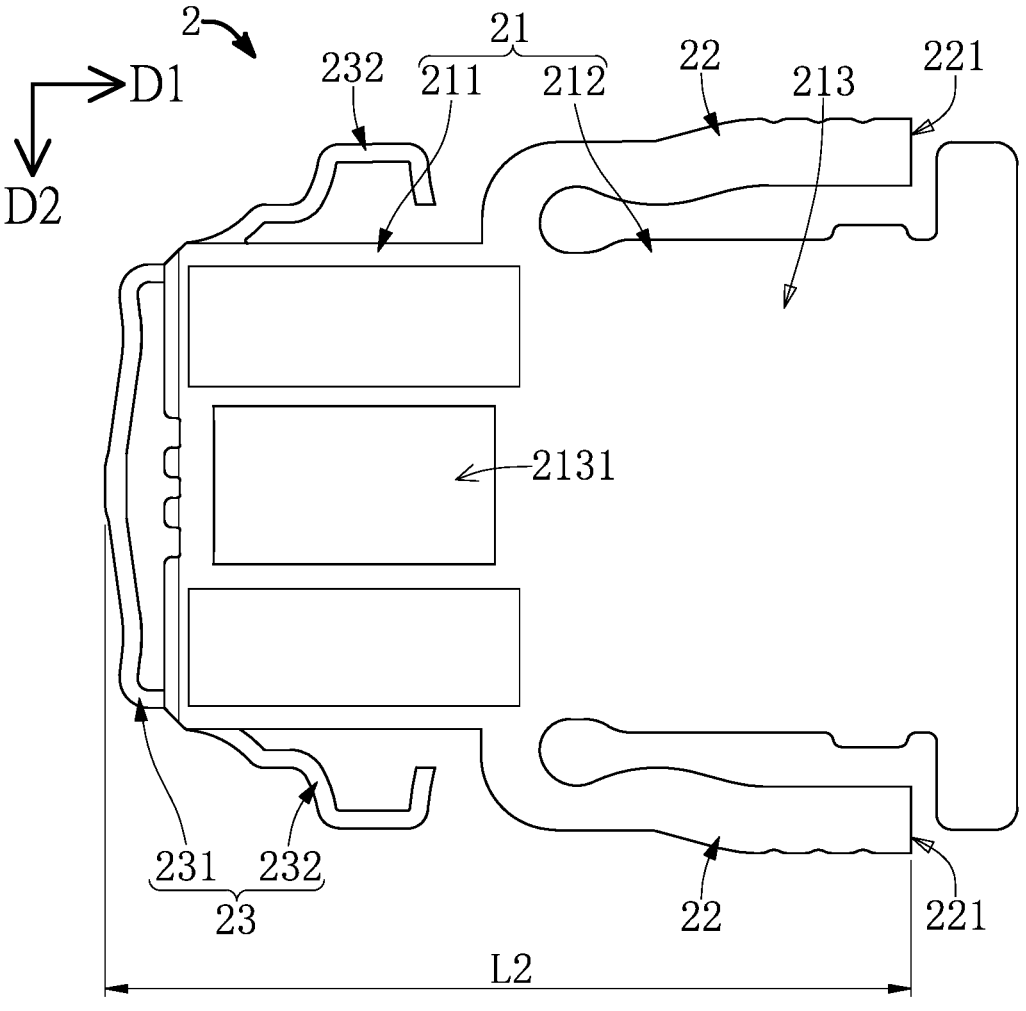
FIG. 10 is a schematic planar view showing a variation of the carrying frame according to the second embodiment of the present disclosure.

Referring to FIG. 9 and FIG. 10, a second embodiment of the present disclosure is provided, which is similar to the first embodiment of the present disclosure. For the sake of brevity, descriptions of the same components in the first and second embodiments of the present disclosure will be omitted herein, and the following description only discloses different features between the first and second embodiments.

In this embodiment, a quantity of the spring arms 231 formed in the elastic structure 23 is two, and the two spring arms 231 are arranged in mirror symmetry as shown in FIG. 9. One end of each spring arm 231 is connected to the body segment 21, for instance, to the frontend portion 211, and the other end of each spring arm 231 is a free end and is not connected to the frontend portion 211 of the body segment 21. The free ends of the two spring arms 231 are adjacent and face each other. In addition, there is the greatest distance L2 between the free end of any one of the two spring arms 231 and the abutting end 221 of any one of the two buckling arms 22 along the insertion direction D1.

As shown in FIG. 10, one end of each side spring arm 232 is connected to the body segment 21 and is arranged adjacent to one of the two spring arms 231, and another end of each side spring arm 232 is a free end and is arranged adjacent to one of the two buckling arms 22. In other words, the free end of each side spring arm 232 is close to but not connected to the frontend portion 211 of the body segment 21.

Furthermore, the elastic structure 23 of the present disclosure is not limited to the structure shown in FIG. 9 and FIG. 10. For example, in other embodiments of the present disclosure, the elastic structure 23 can just have at least one spring arm 231 or only have two side spring arms 232; or the spring arm 231 and the side spring arm 232 of the first embodiment and the second embodiment can be mixed and matched.

Beneficial Effects of the Embodiments

In conclusion, by the elastic structure elastic deforming in the insertion direction to allow the abutting end of each buckling arm to have the displacement for abutting against the hole wall of the corresponding engaging hole, the electronic device, the carrying buckle, and the carrying frame in the present disclosure can be free of gaps between the carrying frame and the retaining case in the insertion direction, so that the noise generated by the carrying frame and the retaining case shifting toward each other is effectively prevented.

Further, the carrying frame provided by the present disclosure encompasses an elastic structure in the form of spring arms that can be adjusted and varied according to design requirements, such as selectively using and matching at least one spring arm with two side spring arms, for each abutting end to firmly abut against the corresponding hole wall.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An electronic device comprising:
a carrying buckle including:
a retaining case having a containing slot and a through channel in communication with the containing slot, the containing slot having a slot opening arranged at one end of the containing slot and in communication with the through channel, two side walls of the containing slot facing one another and respectively forming two engaging holes, and each of the two engaging holes has a hole wall adjacent to the slot opening; and
a carrying frame integrally formed as a single one-piece structure and insertable through the slot opening along an insertion direction to be fixed in the containing slot, the carrying frame including:
a body segment, wherein at least a part of the body segment passes through the through channel and is exposed from the retaining case;
two buckling arms extended respectively from two opposite sides of the body segment and located respectively in the two engaging holes; and
an elastic structure extended from the body segment; wherein, when the elastic structure is pressed by the containing slot along the insertion direction, the elastic structure deforms elastically such that an abutting end of each of the two buckling arms abuts against a corresponding one of the two hole walls; and an electronic component partially located in the through channel and fixed to the body segment, wherein the electronic component is positioned at a preset location through the retaining case.

2. The electronic device according to claim 1, wherein an external surface of the retaining case includes a bonding surface that is opposite to the through channel, and the retaining case is capable of being attached to an object through the bonding surface.

3. The electronic device according to claim 1, wherein the body segment includes:
a frontend portion connected to the elastic structure, wherein the electronic component is fixed to the frontend portion; and
a backend portion connected to the frontend portion along the insertion direction; wherein the two buckling arms are disposed respectively at two opposite sides of the backend portion, and the slot opening is closed off by a tail end of the backend portion.

4. The electronic device according to claim 3, wherein the frontend portion includes at least one assembly section, and the electronic component is installed in the at least one assembly section.

5. A carrying buckle comprising:
a retaining case having a containing slot, wherein the containing slot has a slot opening arranged at one end of the containing slot and two side walls facing each other, and wherein each of the two side walls has an engaging hole having a hole wall adjacent to the slot opening; and
a carrying frame integrally formed as a single one-piece structure and insertable through the slot opening along an insertion direction to be fixed in the containing slot, the carrying frame including:
a body segment;
two buckling arms respectively extended from two opposite sides of the body segment and respectively located in the two engaging holes; and
an elastic structure extended from the body segment; wherein, when the carrying frame is fixed in the containing slot, the elastic structure deforms elastically along the insertion direction, such that an abutting end of each of the two buckling arms abuts against a corresponding one of the two hole walls.

6. The carrying buckle according to claim 5, wherein the retaining case includes a through channel in communication with the containing slot and the slot opening, and at least a part of the body segment passes through the through channel and is exposed from the retaining case.

7. The carrying buckle according to claim 5, wherein the body segment includes:
a frontend portion connected to the elastic structure; and
a backend portion connected to the frontend portion along the insertion direction; wherein the two buckling arms are respectively disposed at two opposite sides of the backend portion, and the slot opening is closed off by a tail end of the backend portion.

8. The carrying buckle according to claim 5, wherein the body segment includes a top side and a bottom side on opposite sides thereof, the body segment has at least one assembly section formed on the top side, and the body segment has a patterned enhancement rib formed on the bottom side.

9. The carrying buckle according to claim 5, wherein the elastic structure includes at least one spring arm away from the slot opening, and the at least one spring arm deforms elastically when being pressed by an end wall of the containing slot in the insertion direction.

10. The carrying buckle according to claim 9, wherein the at least one spring arm and the body segment jointly form an enclosed space.

11. The carrying buckle according to claim 9, wherein one end of the at least one spring arm is connected to the body segment, and another end of the at least one spring arm is a free end.

12. The carrying buckle according to claim 9, wherein the end wall of the containing slot is spaced apart from any one of the two hole walls along the insertion direction by an arrangement distance, and a greatest distance between the at least one spring arm and the abutting end of any one of the two buckling arms along the insertion direction is greater than the arrangement distance.

13. The carrying buckle according to claim 5, wherein each of the two side walls of the containing slot includes a rib away from a corresponding one of the two engaging holes, the elastic structure includes two side spring arms respectively connected to two opposite sides of the body segment and respectively adjacent to the two buckling arms; wherein the two side spring arms deform elastically when being pressed respectively by the two ribs in the insertion direction.

14. The carrying buckle according to claim 13, wherein the body segment and each of the two side spring arms jointly form an enclosed space.

15. The carrying buckle according to claim 13, wherein one end of each of the two side spring arms is connected to the body segment, and another end of each of the two side spring arms is a free end.

16. The carrying buckle according to claim 13, wherein the two side spring arms deform elastically when being pressed respectively by the two side walls in a sideway direction perpendicular to the insertion direction.

17. The carrying buckle according to claim 5, wherein the two buckling arms displace elastically when being pressed respectively by the two side walls in a sideway direction perpendicular to the insertion direction.

18. The carrying buckle according to claim 17, wherein the abutting end of each of the two buckling arms is a free end.

19. The carrying buckle according to claim 17, wherein each of the two engaging holes penetrates the carrying frame in the sideway direction.

20. A carrying frame of a carrying buckle, wherein the carrying frame is integrally formed as a single one-piece structure and is insertable along an insertion direction to be fixed at a retaining case, the carrying frame comprising:

a body segment;

two buckling arms extended respectively from two opposite sides of the body segment; and an elastic structure extended from the body segment; wherein, when the carrying frame is fixed at the retaining case, the elastic structure deforms elastically along the insertion direction, such that an abutting end of each of the two buckling arms has a displacement along the insertion direction.

* * * * *